United States Patent [19]
Smith et al.

[11] Patent Number: 4,914,507
[45] Date of Patent: Apr. 3, 1990

[54] VIDEO SIGNAL TIME EXPANSION/COMPRESSION APPARATUS USING PROGRAMMED OUTPUT VALUES

[75] Inventors: Terrence R. Smith, Westmont; Michael A. Isnardi, Plainsboro; Jack S. Fuhrer, Princeton, all of N.J.; Christopher H. Strolle, Glenside, Pa.

[73] Assignee: General Electric Company, Princeton, N.J.

[21] Appl. No.: 228,193

[22] Filed: Aug. 4, 1988

Related U.S. Application Data

[62] Division of Ser. No. 78,341, Jul. 27, 1987.

[51] Int. Cl.$^4$ .......................................... H04N 5/262
[52] U.S. Cl. ....................................... 358/11; 358/22; 358/160
[58] Field of Search ...................... 358/11, 12, 22, 160

[56] References Cited

U.S. PATENT DOCUMENTS

| | | | |
|---|---|---|---|
| 4,220,965 | 9/1980 | Heitmann et al. | 358/22 |
| 4,302,776 | 11/1981 | Taylor et al. | 358/160 |
| 4,605,952 | 8/1986 | Powers | 358/13 |
| 4,623,922 | 11/1986 | Wischermann | 358/160 |
| 4,703,353 | 10/1987 | David | 358/160 |
| 4,730,215 | 3/1988 | Jose et al. | 358/12 |
| 4,746,979 | 5/1988 | Kashigi | 358/22 |
| 4,757,384 | 7/1988 | Nonweiler et al. | 358/22 |

FOREIGN PATENT DOCUMENTS 2139843  11/1984  United Kingdom ................. 358/335

OTHER PUBLICATIONS

McCoy, A New Digital Video Special-Effects Equipment, SMPTE Journal, Jan. 1978, vol. 87, pp. 20–23.
J. L. LoCicero et al., "A Compatible High Definition Television System (SLSC) with Chrominance and Aspect Ratio Improvements", SMPTE Journal, May 1985, pp. 546–558.
Serial No. 078,150 filed Jul. 27, 1987, for C. H. Strolle, B. J. Roeder, T. R. Smith and M. A. Isnardi, titled "Compatible Widescreen Televison System".
Serial No. 078,340 filed Jul. 27, 1987 for M. A. Isnardi and C. B. Patel, titled "Video Signal Processor with Alternate Subcarrier".
Serial No. 089,637, filed Aug. 26, 1987, for M. A. Isnardi, titled "Apparatus for Processing High Frequency Information in a Widescreen Television System".
Serial No. 139,339, filed Dec. 29, 1987, for J. S. Fuhrer, titled "Compatible Television System with Companding of Auxiliary Signal Encoding Information".
Serial No. 139,337, filed Dec. 29, 1987, for M. A. Isnardi, titled "Television Signal Encoded with Auxiliary Vertical-Temporal Information".
Serial No. 139,338, filed Dec. 29, 1987, for M. A. Isnardi and R. N. Hurst, Jr., titled "Apparatus for Pre-Conditioning Auxiliary Television Signal Information".
Serial No. 139,340 filed Dec. 29, 1987 for M. A. Isnardi, titled "Extended Definition Widescreen Television Signal Processing System".

Primary Examiner—John W. Shepperd
Attorney, Agent, or Firm—Joseph S. Tripoli; Eric P. Herrmann; Ronald H. Kurdyla

[57] ABSTRACT

A system for expanding/compressing a video signal includes a dual-port memory having read and write address inputs and a video signal input. A pixel counter provides a pixel location signal to the write address input of the dual-port memory, and to a programmed memory device (e.g., a PROM) including a look-up table. The memory device is programmed to provide a time expanded/compressed version of the pixel location signal in accordance with a programmed time expansion/compression factor, which is applied to the read address input of the dual-port memory. A time expanded/compressed video signal is developed at the output of the dual-port memory.

24 Claims, 4 Drawing Sheets

VIDEO SIGNAL TIME EXPANSION/COMPRESSION APPARATUS USING PROGRAMMED OUTPUT VALUES

This Application is a divisional of application Ser. No. 078,341 filed July 27, 1987.

BACKGROUND OF THE INVENTION

This invention concerns time expansion and compression apparatus suitable for use in a widescreen television system.

A conventional television receiver, such as a receiver in accordance with NTSC broadcast standards adopted in the United States and elsewhere, has a 4:3 aspect ratio (the ratio of the width to the height of a displayed image). Recently, there has been interest in using higher aspect ratios for television receiver systems, such as 2:1, 16:9 or 5:3, since such higher aspect ratios more nearly approximate or equal the aspect ratio of the human eye than does the 4:3 aspect ratio of a conventional television receiver. Video information signals with a 5:3 aspect ratio having received particular attention since this ratio approximates that of motion picture film, and thus such signals can be transmitted and received without cropping the image information.

In accordance with the principles of the present invention, there are disclosed herein method and apparatus for time expanding and compressing a widescreen video signal representing a picture having an aspect ratio greater than the standard 4:3 aspect ratio, such as described in U.S. Pat. No. 4,782,383—M. A. Isnardi, for example.

SUMMARY OF THE INVENTION

In a preferred embodiment of a compatible widescreen television system employing time expansion/compression apparatus in accordance with the principles of the present invention, a widescreen signal having left side, right side and center video information panels is converted into a signal compatible with a standard system, such as NTSC for example, by compressing side panel low frequency information of the widescreen signal into left and right overscan regions which are present in the standard system but not seen by a viewer, and by simultaneously time expanding the center panel information to occupy the standard display region seen by a viewer. High frequency side panel information is encoded by quadrature modulating such high frequency information on an alternate subcarrier signal other than the chrominance subcarrier.

In accordance with the principles of the present invention, in the illustrated embodiment, the time expansion and time compression is accomplished by apparatus including a video signal pixel counter, a programmed memory device such as a programmable read-only memory including a programmed look-up table, and a dual-port memory unit. The pixel counter provides an output pixel location signal representative of pixel locations along a video signal scanning direction. The programmed memory device receives the pixel location signal, and is programmed to provide an output time expanded/compressed version of the pixel location signal in accordance with a programmed time expansion/compression factor. The memory unit has inputs for receiving the video signal, the pixel location signal and the time expanded/compressed output signal from the programmed memory device, and provides a time expanded/compressed video output signal in accordance with the time expansion/compression factor.

The time expansion and compression apparatus to be discussed is advantageously used in a widescreen television system such as described in U.S. Pat. No. 4,782,383—Isnardi. Before discussing the time expansion and compression apparatus of FIG. 1, reference is made to signal waveforms A and B of FIG. 2. Signal A is a 5:3 aspect ratio widescreen signal that has been converted to a standard NTSC compatible signal with a 4:3 aspect ratio as indicated by signal B. Widescreen signal A includes left and right side panel portions each associated with intervals TS which typically are of equal duration, and a center panel portion associated with an interval TC. Widescreen signal A has been converted to NTSC signal B by compressing certain side panel information completely into the horizontal overscan regions associated with time intervals TO. The NTSC signal has an active line interal TA (approximately 52.5 microseconds duration) which encompasses overscan intervals TO, a display time interval TD which contains the video information to be displayed, and a total horizontal line time interval TH of approximatley 63.556 microseconds duration. Intervals TA and TH are the same for both the widescreen and NTSC signals. It has been found that almost all consumer television receivers have an overscan interval which occupies at least 4% of the total active line time TA, i.e., 2% overscan on the left and right sides. At a sampling rate of $4 \times f_{sc}$ (where $f_{sc}$ is the frequency of the color subcarrier), each horizontal line interval contains 910 pixels (picture elements) of which 754 constitute the active horizontal line image information to be displayed.

Figure 1:
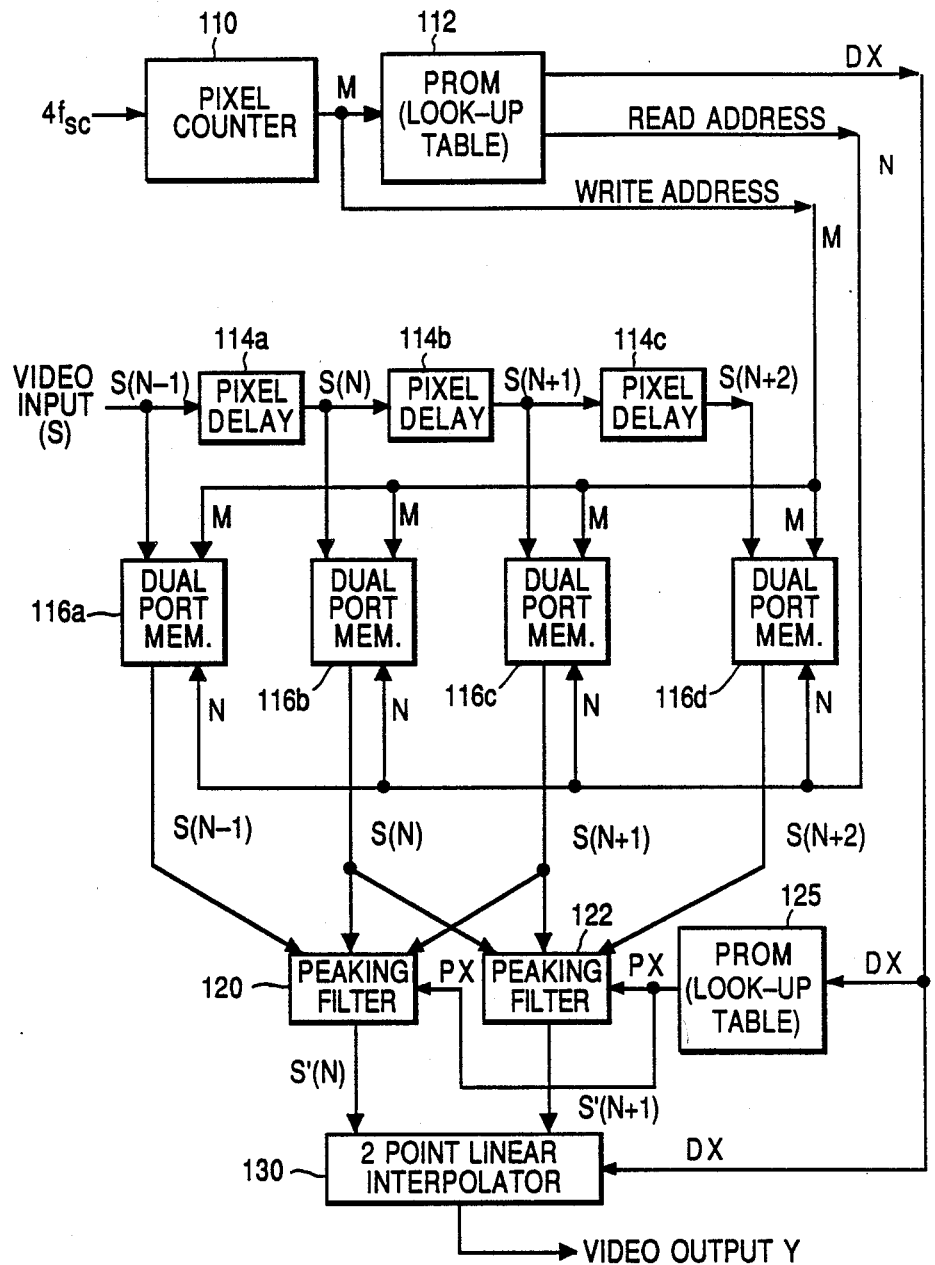
FIGS. 1 and 3-6 illustrate aspects of apparatus in accordance with the principles of the present invention.
Figure 2:
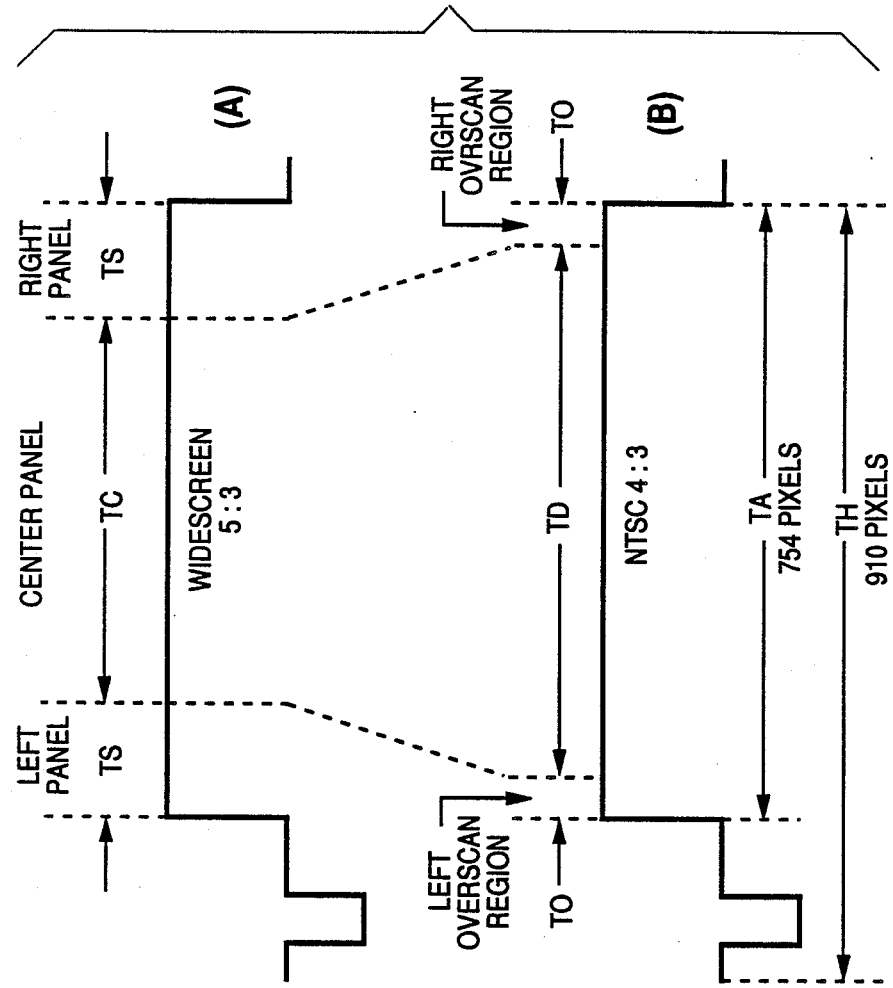
FIG. 2 depicts waveforms helpful in understanding the operation of the apparatus in FIG. 1.
Figure 3:
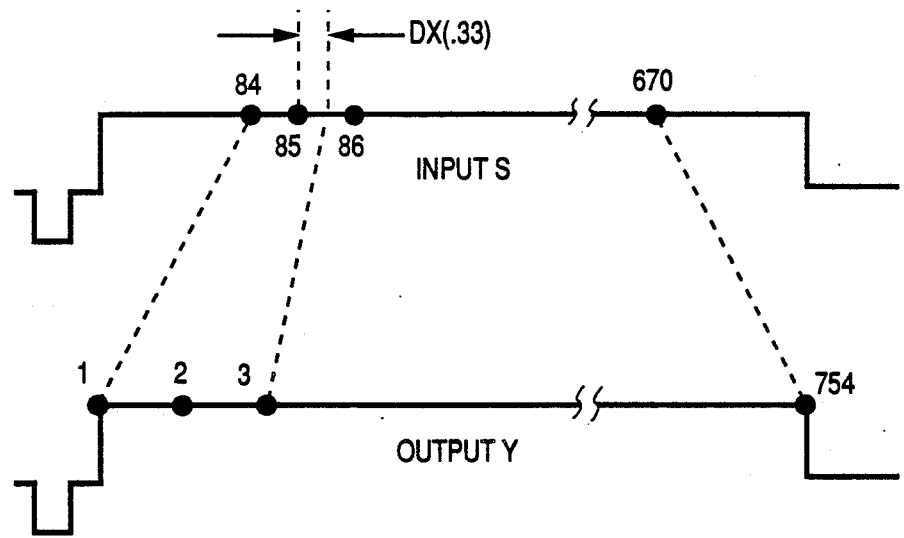

FIG. 1 illustrates raster mapping apparatus which can be used for the time expansion and compression. In this regard, reference is made to the waveforms of FIG. 3 which illustrates the mapping process. FIG. 3 shows an input signal waveform S with a center portion between pixels 84 and 670 which is intended to be mapped into pixel locations 1–754 of an output waveform Y by means of a time expansion process. End point pixels 84 and 670 of waveform S map directly into end point pixels 1 and 754 of waveform Y. Intermediate pixels do not map directly on a 1:1 basis due to the time expansion, and in many cases do not map on an integer basis. The latter case is illustrated wherein, for example, pixel location 85.33 of input waveform S corresponds to integer pixel location 3 of output waveform Y. Thus pixel location 85.33 of signal S contains an integer part (85) and a fractional part DX (0.33), and pixel location 3 of waveform Y contains an integer part (3) and a fractional part (0).

In FIG. 1, a pixel counter 110 operating at a $4 \times f_{sc}$ rate provides an output WRITE ADDRESS signal M representative of pixel locations (1 ... 754) on an output raster. Signal M is applied to PROM (Programmable Read Only Memory) 112 which includes a look-up table containing programmed values depending upon the nature of raster mapping to be performed, e.g., compression or expansion. In response to signal M PROM 112 provides an output READ ADDRESS signal N representing an integer number, and an output signal DX representing a fractional number equal to or greater than zero but less than unity. In the case of a 6-bit signal DX ($2^6=64$), signal DX exhibits fractional parts 0, 1/64, 2/64, 3/64 . . . 63/64.

PROM 112 permits expansion or compression of a video input signal S as a function of stored values of signal N. Thus a programmed value of READ ADDRESS signal N and a programmed value of fractional part signal DX are provided in response to integer values of pixel location signal M. To achieve signal expansion, for example, PROM 112 is arranged to produce signal N at a rate slower than that of signal M. Conversely, to achieve signal compression, PROM 112 provides signal N at a rate greater than that of signal M.

Video input signal S is displayed by cascaded pixel delay elements 114a, 114b and 114c to produce video signals S(N+2), S(N+1) and S(N) which are mutually delayed versions of the video input signal. These signals are applied to video signal inputs of respective dual port memories 116a-116d, as are known. Signal M is applied to a write address input of each of memories 116a-116d, and signal N is applied to a read address input of each of memories 116a-116d. Signal M determines where incoming video signal information will be written into the memories, and signal N determines which values will be read out of the memories. The memories can write into one adress while simultaneously reading out of another address. Output signals S(N−1), S(N), S(N+1) and S(N+2) from memories 116a-116d exhibit a time expanded or time compressed format depending upon the read/write operation of memories 116a-116d which is a function of how PROM 112 is programmed.

Figure 4:
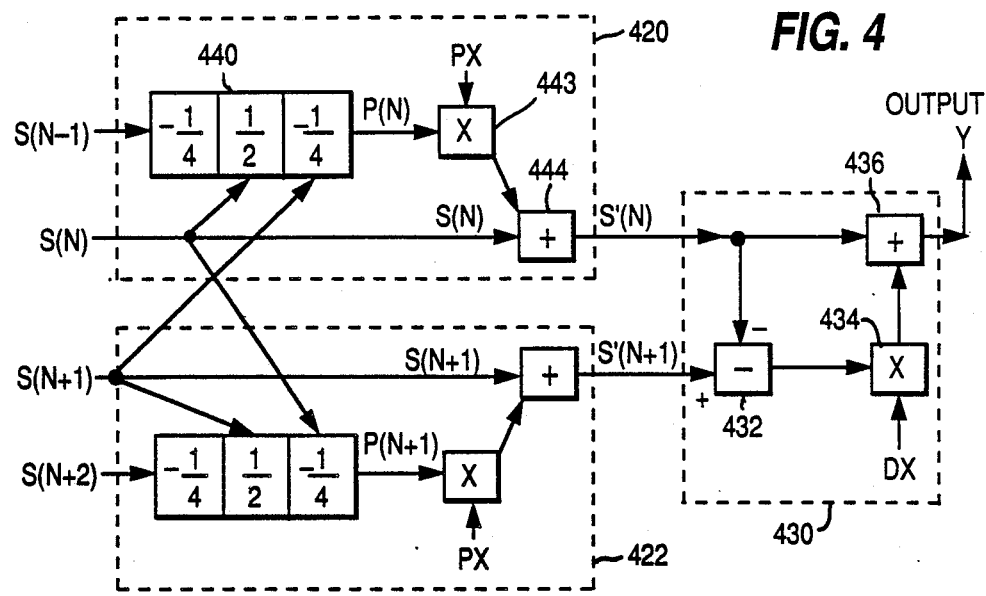
Figure 5:
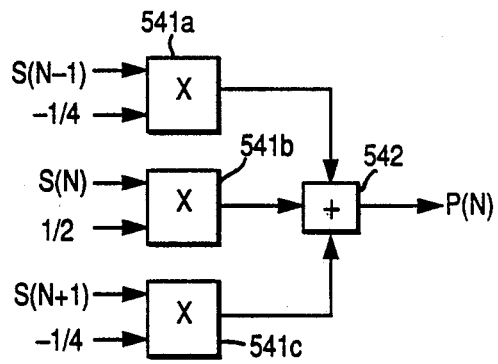
Figure 6:
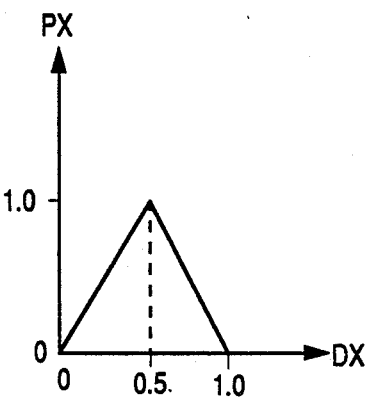

Signals S(N−1), S(N), S(N+1) and S(N+2) from memories 116a-116d are processed by a four-point linear interpolator including peaking filters 120 and 122, a PROM 125 and a two point linear interpolator 130, details of which are shown in FIGS. 4 and 5. Peaking filters 120 and 122 receive three signals from the group of signals including signals S(N−1), S(N), S(N+1) and S(N+2), as shown, as well as receiving a peaking signal PX. The value of peaking signal PX varies from zero to unity as a function of the value of signal DX, as shown in FIG. 6, and is provided by PROM 125 in response to signal DX. PROM 125 includes a look-up table and is programmed to produce a given value of PX in response to a given value of DX.

Peaking filters 120 and 122 respectively provide peaked mutually delayed video signals S'(N) and S'(N+1) to two-point linear interpolator 130 which also receives signal DX. Interpolator 130 provides a (compressed or expanded) video output signal Y, where output signal Y is defined by the expression $$Y = S'(N) + DX [S'(N+1) - S'(N)]$$

The described four-point interpolator and peaking function advantageously approximates a (sin X)/X interpolation function with good resolution of high frequency detail.

FIG. 4 shows details of peaking filters 120 and 122, and interpolator 130. In FIG. 4, signals S(N−1), S(N) and S(N+1) are applied to a weighting circuit 440 where these signals are respectively weighted by peaking coefficients −¼, ½ and −¼. As shown in FIG. 5, weighting circuit 440 comprises multipliers 541a-541c for respectively multiplying signals S(N−1), S(N) and S(N+1) with peaking coefficients −¼, ½ and −¼. Output signals from multipliers 541a-541c are summed in an adder 542 to produce a peaked signal P(N), which is multiplied by signal PX to produce a peaked signal which is summed with signal S(N) to produce peaked signal S'(N). Peaking filter 422 exhibits similar structure and operation.

In two point interpolator 430, signals S'(N) is subtracted from S'(N+1) in a subtractor 432 to produce a difference signal which is multiplied by signal DX in a multiplier 434. The output signal from multiplier 434 is summed with signal S'(N) in an adder 436 to produce output signal Y.

The principles of the disclosed invention are applicable to other types of standard broadcast television systems, such as PAL for example.

What is claimed is:

1. In a system for processing a widescreen video signal containing a main panel component and a side panel component each having associated picture element image information, apparatus for providing video signal time expansion or time compression comprising:

pixel counter means responsive to a clock signal for providing an output pixel location signal representative of pixel locations along a video signal scanning direction of said main panel and side panel components;

a programmed memory device for receiving said pixel location signal, said programmed memory device being a single device programmed so as to provide at a first output one of a time expanded or time compressed version of said pixel location signal for one of said main panel and side panel components in accordance with programmed values; and memory means having a first input for receiving said video signal, a second input for receiving said pixel location signal, a third input for receiving said signal from said first output of said programmed memory device, and a video signal output at which a time expanded or time compressed video signal is provided in accordance with said programmed values.

2. In a system for processing a video signal containing picture element image information, apparatus for providing video signal time expansion or time compression comprising:

pixel counter means responsive to a clock signal for providing an output pixel location signal representative of pixel locations along a video signal scanning direction;

a programmed memory device for receiving said pixel location signal, said programmed memory device being a single device programmed so as to provide at a first output one of a time expanded or time compressed version of said pixel location signal in accordance with programmed values;

plural memory means each having a first input for receiving a video signal, a second input for receiving said pixel location signal, a third input for receiving said signal from said first output of said programmed memory device, and a video signal output at which a time expanded or time compressed video signal is provided in accordance with said programmed values; and interpolator means responsive to time expanded/compressed video output signals from said plural memory means for providing an interpolated time expanded/compressed video signal.

3. A system according to claim 2, wherein:
said programmed memory device is a programmable read-only memory including a look-up table.

4. A system according to claim 2, wherein:
said programmed memory device provides an output signal at a rate slower than that of said input pixel location signal to achieve time expansion; and
said programmed memory device provides an output signal at a rate faster than that of said input pixel location signal to achieve time compression.

5. A system according to claim 2, wherein:
said signal provided at said first output of said programmed memory device represents an integer number; and
said programmed memory device comprises a second output providing a signal representing a fractional number associated with said integer number.

6. A system according to claim 2, wherein:
each of said plural memory means is a dual-port memory wherein said second input is a write address for receiving said pixel location signal to determine where incoming video signal information will be written into memory, and wherein said third input is a read address for receiving said time expanded/compressed pixel location signal to determine which values will be read out of memory.

7. A system according to claim 2, wherein:
video signals respectively received by each of said video signals inputs of said plural memory means are mutually successively delayed by a pixel interval.

8. A system according to claim 2, wherein:
said interpolator means is a two-point linear interpolator.

9. A system according to claim 2, and further comprising:
peaking means located between said plural memory means and said interpolator means, said peaking means being responsive to time expanded/compressed video signals from said plural memory means for providing peaked time expanded/compressed video signals to said interpolator means.

10. A system according to claim 9, wherein:
said signal provided at said first output of said programmed memory device represents an integer number;
said programmed memory device comprises a second output providing a signal representing a fractional number associated with said integer number, said fractional number being representative of the distance between a time expanded/compressed pixel and an original pixel; and
said peaking means provides an amount of peaking to said time expanded/compressed video signal in response to a peaking control signal responsive to the value of said signal provided at said second output of said programmed memory means.

11. A system according to claim 10, wherein:
said peaking control signal is provided by a further programmed memory device responsive to said signal provided at said second output of said programmed memory device.

12. A system according to claim 2, wherein:
said video signal is a widescreen signal having a greater than standard image aspect ratio, said widescreen signal having side portion image information and dominant non-side portion image information.

13. A system according to claim 12, wherein:
said memory means provides a video output signal having one of a time expanded main panel component or a time compressed side panel component.

14. A decoder system according to claim 12, wherein:
said memory means provides a video output signal having one of a time compressed main panel component or a time expanded side panel component.

15. In a system for processing a video signal containing picture element image information, apparatus comprising:
pixel counter means responsive to a clock signal for providing an output pixel location signal representative of pixel locations along a video signal scanning direction;
programmed memory means for receiving said pixel location signal, said programmed memory means being programmed so as to provide at a first output a time expanded/compressed version of said pixel location signal representative of an integer number in accordance with a programmed time expansion/compression factor, and to provide at a second output a signal representing a fractional number associated with said integer number; and
memory means having a first input for receiving said video signal, a second input for receiving said pixel location signal, a third input for receiving said time expanded/compressed output signal from said programmed memory means, and a video signal output at which a time expanded/compressed video signal is provided in accordance with said time expansion/compression factor.

16. In a system for processing a video signal containing picture element (pixel) image information, apparatus comprising:
pixel counter means responsive to a clock signal for providing an output pixel location signal representative of pixel locations along a video signal scanning direction;
programmed memory means for receiving said pixel location signal, said programmed memory means being programmed so as to provide at a first output a time expanded/compressed version of said pixel location signal representative of an integer number in accordance with a programmed time expansion/compression factor, and to provide at a second output a signal representing a fractional number associated with said integer number;
plural memory means each having a first input for receiving a video signal, a second input for receiving said pixel location signal, a third input for receiving said time expanded/compressed output signal from said programmed memory means, and a video signal output at which a time expanded/compressed video signal is provided in accordance with said time expansion/compression factor; and
interpolator means responsive to time expanded/compressed video output signals from said plural memory means for providing an interpolated time expanded/compressed video signal.

17. A system according to claim 16, wherein:
each of said plural memory means is a dual-port memory wherein said second input is a write address for receiving said pixel location signal to determine where incoming video signal information will be written into memory, and wherein said third input is a read address for receiving said time expanded/compressed pixel location signal to determine which values will be read out of memory.

18. A system according to claim 16, wherein:
said interpolator means is a two-point linear interpolator.

19. A system according to claim 16, and further comprising:
peaking means located between said plural memory means and said interpolator means, said peaking means being responsive to time expanded/compressed video signals from siad plural memory means for providing peaked time expanded/compressed video signals to said interpolator means.

20. A system according to claim 19, wherein:
said fractional number is representative of the distance between a time expanded/compressed image pixel and an original image pixel; and
said peaking means provides an amount of peaking to said time expanded/compressed video signal in response to a peaking control signal responsive to the value of said signal provided at said second output of said programmed memory means.

21. A system according to claim 20, wherein:
said peaking control signal is provided by a programmed memory device responsive to said signal provided at said second output of said programmed memory means.

22. A system according to claim 16, wherein:
said video signal is a widescreen signal having a greater than standard image aspect ratio, said widescreen signal having a side panel component and a main panel component.

23. A system according to claim 22 in a video signal encoder, wherein:
said memory means provides a video output signal having one of a time expanded main panel component or a time compressed side panel component.

24. A decoder system according to claim 22 in a video signal decoder, wherein:
said memory means provides a video output signal having one of a time compressed main panel component or a time expanded side panel component.

* * * * *